US005417376A

United States Patent [19]
Holmes et al.

[11] Patent Number: 5,417,376
[45] Date of Patent: May 23, 1995

[54] BONE ELIMINATOR DISCHARGE REGULATOR

[75] Inventors: Terry L. Holmes, DeForest; Jay I. Gust, Poynette; William G. VanDyke, Sun Prairie, all of Wis.

[73] Assignee: Oscar Mayer Foods Corporation, Madison, Wis.

[21] Appl. No.: 190,627

[22] Filed: Feb. 2, 1994

[51] Int. Cl.[6] .......... B02C 18/30; F16K 51/00
[52] U.S. Cl. .......... 241/82.5; 251/321
[58] Field of Search .......... 241/82.1-82.7, 241/32, 101.2; 251/320, 321, 322, 323, 337, 339

[56] References Cited

U.S. PATENT DOCUMENTS

| | | | |
|---|---|---|---|
| Re. 31,631 | 7/1984 | McFarland . | |
| Re. 32,050 | 12/1985 | McFarland . | |
| Re. 32,060 | 12/1985 | McFarland . | |
| 3,242,957 | 3/1966 | Provenzano . | |
| 3,362,044 | 1/1968 | Irving | 241/82.1 X |
| 3,432,344 | 3/1969 | Farmer . | |
| 3,768,741 | 10/1973 | Mills . | |
| 4,014,075 | 3/1977 | Van Bergen . | |
| 4,189,104 | 2/1980 | Dos Santos . | |
| 4,340,184 | 7/1982 | Poss . | |
| 4,536,920 | 8/1985 | Amersfoort . | |
| 4,795,104 | 1/1989 | Rudibaugh . | |
| 4,844,372 | 7/1989 | Weiler et al. . | |
| 4,878,815 | 11/1989 | Stachowiak . | |
| 4,928,892 | 5/1990 | Huebner et al. | 241/82.5 |
| 5,064,168 | 11/1991 | Raines et al. | 251/323 X |
| 5,251,829 | 10/1993 | Lesar . | |

*Primary Examiner*—Timothy V. Eley
*Attorney, Agent, or Firm*—Lockwood, Alex, Fitzgibbon & Cummings

[57] ABSTRACT

A device for regulating the discharge of bones and other hard, objectionable material from processed food includes a flow control device contained within a housing applied to the discharge line downstream of a grinding apparatus. The device has a reciprocating valve element having an elongated cylindrical valve head with a groove formed therein at an angle to the longitudinal axis of the valve element. This groove is constantly contacted by the discharge product flow stream in open and closed positions of the valve.

31 Claims, 2 Drawing Sheets

BONE ELIMINATOR DISCHARGE REGULATOR

BACKGROUND AND SUMMARY OF THE INVENTION

The present invention relates generally to a bone elimination apparatus, and more specifically, to a means for regulating the discharge of bones and other hard materials from a bone elimination apparatus.

In the food processing industry animal carcasses or remnants are used to produce ground food material. After choice and select portions of the animal are removed from the carcasses, some useable portions of food remain on the carcasses. This useable material may be recovered from the carcasses by subjecting the carcasses to a grinding process. In such processes, the animal carcasses are inserted into a grinding apparatus where the useable food material is processed into a ground form, while the remaining bone and hard tissues are separated and discharged from the grinding apparatus to waste.

Bone elimination devices are well known in the food processing industry. For the most part, these devices are used in association with a grinding apparatus of the type having a tubular grinding chamber with a rotating compression screw or auger extending within the grinding chamber. Food parts, such as carcasses or remnants, are placed into the chamber where the auger contacts and drives the food material through the tube, forming a food material mass in the grinding chamber. The auger may include a series of grinding blades which cut the useable material from the carcasses and may also press it against a perforated portion of the grinding chamber. The auger compresses the food material against the perforations and forces the useable, ground food material out of the grinding chamber through the perforations while retaining the bones and connective tissues in the grinding chamber.

The bones and hard tissue are heavier than the useable soft material of the carcasses so that during the grinding process, this heavier material tends to collect along the auger shaft where it is pushed down the length of the grinding chamber to the end of the grinding chamber. This unusable material is typically discharged through a tube extending out of the meat grinding chamber to a waste collection point. Examples of bone removal equipment having a structure as noted above are fully described in U.S. Pat. Nos. 4,536,920 issued Aug. 27, 1985 and Re. 31,631, issued Jul. 17, 1984.

The equipment described in these two patents utilize an orifice of decreasing size which collects the bones and hard material for discharge and expels them through a discharge opening. Depending on the type of food material being processed, some useable food material may remain on the carcasses or remnants. Other patents describe devices which are suitable for recovering useable food material which still may be attached on the unusable hard portions of the carcasses after a first grinding. Such an apparatus is described in U.S. Pat. No. 5,251,829, issued Oct. 12, 1993 to Weiler and Company of Whitewater, Wis. This patent describes a bone collector assembly in which an additional, or secondary, grinding chamber is located downstream of the primary grinding chamber. This secondary grinding chamber has an additional auger and knife assembly which grinds the hard material discharged from the first grinding chamber a second time, thereby increasing the yield of the useable food material from carcasses.

In using an apparatus of the type described in the above-mentioned '829 patent, it has come to be appreciated that occasionally relatively large amounts of food material are discharged from the grinder apparatus in sporadic spurts as a result of the overall backpressure within the system. When food material is discharged from such a grinding apparatus in large spurts, the backpressure of the system is reduced, and useable food material may be easily ejected out of the grinder along with the unusable material. When large amounts of useable material are discharged in this manner, some food processors may reintroduce the expelled material back into the grinding apparatus for regrinding in an attempt to recover additional useable material. When this reintroduction occurs, the likelihood is increased that some of the hard unusable portions of the food material may be ground into the useable food material, leading to an inferior quality of the ultimate processed food product.

The present invention is therefore directed to a solution to this problem by providing a means to increase the backpressure of the grinding system which regulates the discharge of bones and hard materials from the grinder, thereby substantially eliminating the need to regrind discharged material and reducing the likelihood of reintroducing bone and foreign objects into the processed food material.

In accordance with the present invention, a discharge valve means is provided within the discharge tube of a food grinder which provides control over the flow and backpressure of the grinding apparatus. The valve means is contained within a housing adapted for connection to the discharge opening of a food grinding apparatus. The valve means includes a valve element slidably mounted therein between inlet and outlet openings of the housing. Movement of the valve element occurs along the longitudinal axis of the housing. The valve element includes a valve head or plug for sealing the inlet of the control housing which consequently seals the discharge of the grinding apparatus. The walls of the inlet opening of the control housing serve as the valve seat and cooperate with a multi-surfaced portion of the valve head to regulate a precise flow rate of discharge out of the system so as to remove only rejectable material from the grinder product flow stream.

The multiple surfaces of the valve head serve to increase the overall surface area of the valve head (as compared to a valve element having a constant planar pressure surface profile) in contact with the grinder product flow stream. In a preferred profile, the valve may include a circular groove which extends lengthwise within the valve head at an angle from its axis to define a variable discharge passage in the valve head, such that as the system pressure increases, the valve opening incrementally increases to reduce back pressure on the system so that substantially only rejectable food material is removed from the grinder product flow stream.

Accordingly, it is an object of the present invention to provide a means for regulating the discharge of bones and other hard material from a food material grinder.

It is another object of the present invention to provide a means for increasing the backpressure of a food material grinding apparatus having a bone discharge device which incorporates a flow control means into the bone discharge line of the grinding apparatus which regulates the amount of unusable material discharged from the grinding apparatus, which discharge is regulated solely by the flow of unusable material exiting from the grinding apparatus and not by any external regulation means.

It is still another object of the present invention to provide a means for providing a controlled backpressure on a discharge line of a food material grinding apparatus and thereby regulating the discharge of bones and unusable food material out of the grinding apparatus, wherein the means includes a discharge flow control valve disposed within a bone discharge line, the valve having a valve element which contains a groove of variable size, the size of the groove depending upon the movement of the valve element within the housing in response to the grinding apparatus backpressure, which groove is in contact with the grinding apparatus product flow stream.

Yet another object of the present invention is to provide a bone discharge regulating device for use on a food material grinder having a bone elimination and discharge component, wherein the device is mounted in a discharge line of the bone elimination and discharge component and includes a valve element having a multiple surface profile in contact with the product flow stream, the valve element including a reciprocatable plunger element disposed in the discharge line, the plunger element having a longitudinal groove extending therein, the groove presenting a valve opening which has a specific size at an open position of the valve and which steadily decreases as the valve closes, thereby providing a variable opening within the plunger element which permits bone material to pass through the discharge line through the plunger element groove.

Another object of the present invention is to provide a means for controlling the flow of waste material out of a food grinding apparatus which substantially reduces the overall amount of material discharged to waste from the grinding apparatus while removing substantially all of the bones, hard material and foreign objects from the food material being processed.

These and other objects, features and advantages of the present invention will be clearly understood through a consideration of the following detailed description.

BRIEF DESCRIPTION OF THE DRAWINGS

In the course of this description, reference will be frequently made to the attached drawings in which.

DETAILED DESCRIPTION OF THE PREFERRED EMBODIMENTS

Figure 1:
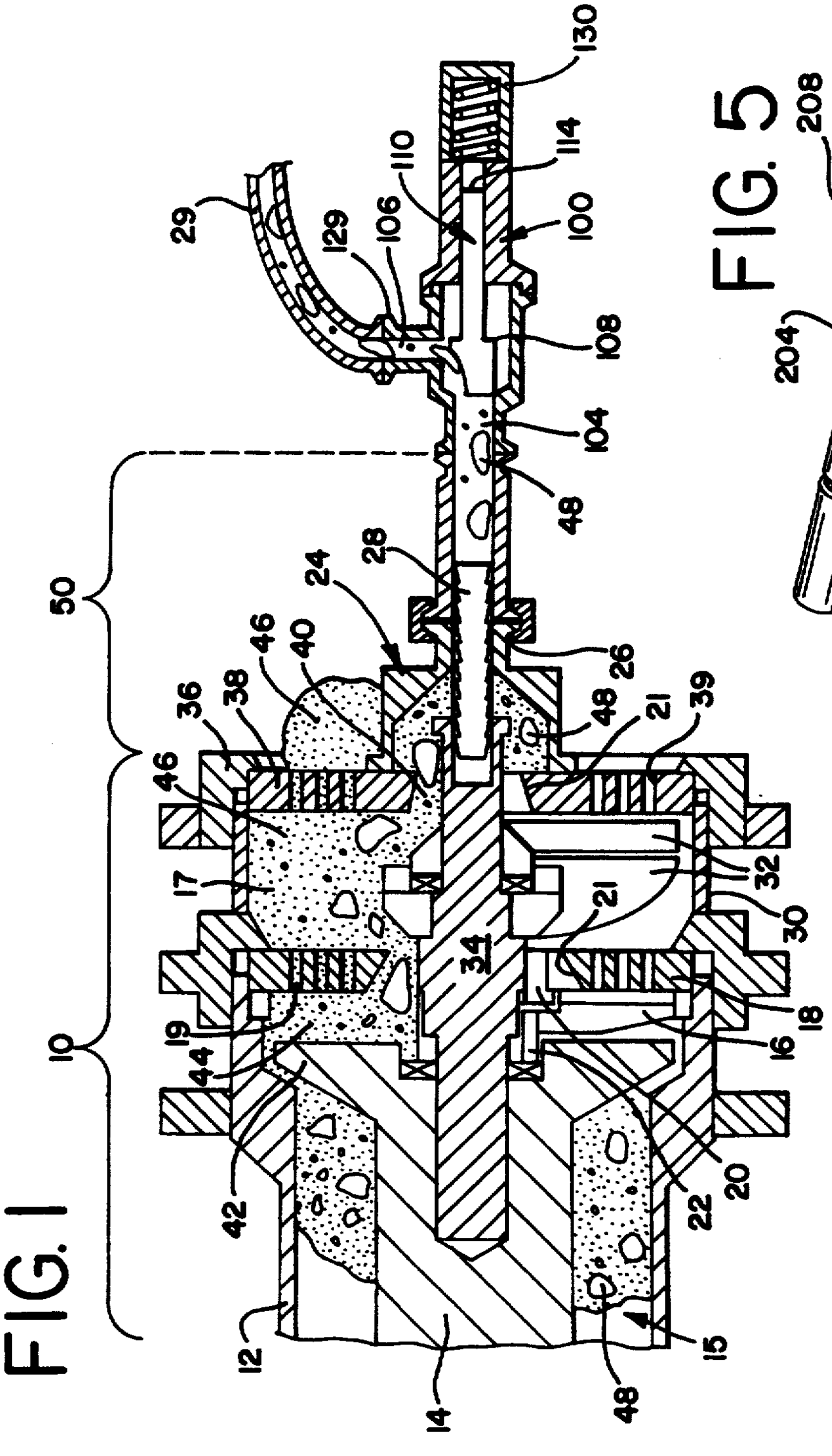
FIG. 1 is a sectional view of the discharge end of a conventional meat grinder having a bone elimination apparatus with a bone discharge tube exiting therefrom which incorporates a bone discharge regulator constructed in accordance with the principles of the present invention.

FIG. 1 is a sectional view of a food material grinding apparatus 10 having a bone removal mechanism 50 upon which the present invention is used. The grinding apparatus 10 illustrated in FIG. 1 is a conventional one manufactured by Weiler and Company of Whitewater, Wis. Generally, the grinder apparatus 10 includes a cylindrical housing 12 having an elongated feed screw or auger 14, extending longitudinally within the housing. The housing 12 forms a primary grinding chamber 15 of the apparatus which contains the auger 14 and a rotating knife assembly 16 mounted in the grinding chamber 15. In FIG. 1, for purposes of clarity, certain of the components present above the centerline have been removed to show the placement and passage of the food material mass. These components are symmetrical and have a counterpart half illustrated below the centerline of the grinding apparatus.

The knife assembly 16 is generally located near the end of the grinding chamber 15 adjacent an orifice plate 18 thereof. The orifice plate 18 contains two sets of openings 19, 20 arranged in a preselected pattern. Openings 19 are relatively small in size and are usually arranged near the outer perimeter of the orifice plate 18. These openings 19 serve as discharge openings or passages for ground, useable food material and may either be open to the environment or, as shown in FIG. 1, to a secondary grinding chamber 17. The other openings 20 are larger in size than openings 19 and are positioned near the center of the orifice plate 18 around the knife assembly hub 22. These openings 20 serve as passages for useable food material to a second grinding chamber 17 and ultimately, to a bone collector cone 24 in the embodiment shown. These larger openings 20 may be, for example, generally circular or may, if desired, be of an irregular shape.

The bone collector cone 24 tapers along its length and terminates in a tube portion 26 at its end. A bone discharge auger 28 which is joined to the feed screw 14 by a suitable connection may extend through the collector cone 24 and may partially extend into the discharge tube portion 26. The bone collector cone 24 may be joined as shown to the secondary grinding chamber 17, or it may be joined to the orifice plate 18 at the end of the first grinding chamber 15. The secondary grinding chamber 17 is defined by a cylindrical extension 30 of the main apparatus housing 12. This extension 30 is smaller than the grinding apparatus main housing 12 and may contain an additional knife assembly 32 mounted for rotation on a shaft extension 34.

An endwall 36 of the extension 30 includes another orifice plate 38 similar in configuration to the first orifice plate 18 and has two sets of differently sized openings 39,40. The first openings 39 are small and open to the environment to provide an exit passage for useable food material, while the other openings 40 are large and provide exit passages for bone and other hard and connective tissue.

In operation of the grinding apparatus 10, food parts, such as carcasses or remnants of meat, poultry or fish are fed into a hopper (not shown) of the grinder apparatus 10. These carcasses typically contain variable amounts of useable food material attached to larger amounts of hard, unusable material such as bone, cartilage, sinew, gristle or the like. The auger 14 is powered by an electric motor and rotates within the grinding chamber 15 of the apparatus 10. The auger 14 contacts the carcasses with exterior flights 42. The auger 14 applies pressure to the carcasses and forms a food material mass 44 which is propelled through the grinding chamber 15 by the auger 14. The pressure within the grinding chamber 15 progressively increases along the length thereof as the auger 14 rotates.

During rotation, the harder material 46 (bones, etc.) will typically settle toward the center of the grinding chamber 15 along the shaft of the auger 14 while the softer, useable food material 46 which is separated from the carcasses during grinding is forced radially outwardly in the grinding chamber 15. The useable and unusable food material are combined within the grinding chamber 15 into a single mass 44 which is forced toward the end of the grinding chamber 15 by the auger 14 until it contacts the orifice plate 18. The useable food material 46 is forced through the small openings 19 of orifice plate 18 by the blades of the knife assembly 16 out of the grinding chamber 15.

The knife assembly 16 also drives the hard, unusable food material 48 into the large openings 20 at the center of the orifice plate 18. Ramped entryways 21 on the openings 20 may assist the unusable material 48 in entering the large openings 20 during rotation of the auger 14 and knife assembly 16. Where large pieces of unusable material are larger than the openings 20, they catch in the openings 20 and are sheared into smaller pieces by rotation of the knife blades until they are reduced to a size at which they readily pass through the large openings 20.

The useable food material 46 is partially ground during its travel through the grinding chamber 15 and is further ground as it is driven through the small openings 19 of the orifice plate 18. The openings 19 may open directly to a collection hopper (not shown) positioned beneath the orifice plate 18. In the embodiment illustrated in FIG. 1, after grinding in the chamber 15, the food material mass 44 is slowly pushed into the additional or downstream chamber 17 where it contacts the additional or downstream knife assembly 32 and some additional useable food material 46 is removed from the unusable food material 48 in the mass 44. The useable food material 46 is pressed through the additional chamber small openings 39 in an orifice plate 38, while the unusable food material 48 is forced through the larger discharge openings 40 into the bone collection cone 24.

The bones and other unusable food material may be assisted in travel through the bone collection cone 24 by a bone discharge auger 28 attached to the auger 14 which rotates within the cone 24 and discharge tube portion 26 thereof. This waste material is then passed into a discharge pipe conduit 29 to a waste disposal area.

The apparatus described above does not form any part of the present invention, but serves primarily to describe the preferred environment in which the present invention is used to obtain an overall reduction in the discharge from the bone collection and elimination apparatus 50. Further details on the structure and operation of this particular apparatus are described in U.S. Pat. No. 5,251,829 assigned to Weiler and Company.

A device for regulating the discharge of the bones from the grinder 10 is shown generally indicated as 100 in FIG. 1, attached to the bone discharge tube 26 downstream of the bone discharge auger 28. The regulating device 100 comprises an elongated housing 102 adapted for connection to the discharge tube 26. The housing 102 includes an inlet passage 104, an outlet passage 106 and a chamber 108 situated between the inlet and outlet passages. As illustrated in the Figures, the inlet passage 104 is preferably located within the housing 102 at an angle to the outlet passage 106 so that the valve chamber 108 may accommodate a reciprocatable valve element 110. The valve element 110 is disposed in the chamber 108 along a longitudinal axis of the inlet passage 104. The housing 102 may be formed of two interengaging component parts **102*a*, 102*b* which may be separated to facilitate assembly and cleaning of the flow control device 100. Each inlet and outlet may have a projecting rim 129** which defines a point of attachment to the grinding apparatus.

The valve element 110 may take the configuration of a plunger element 115 having an elongated valve stem 114 terminating in a cylindrical valve head 112. To effect the reciprocating movement necessary for operation, the valve stem 114 is slidably supported within a slot, or channel 116, formed in the body portion 118 of the housing 102. The device 100 preferably includes a means for biasing the valve element 110 into an initial position, and may include any suitable means such as a pneumatic cylinder 131, a fluid cylinder or a spring 130.

Turning now to FIGS. 2-4, the valve head 112 is preferably complementary in configuration to the inlet passage 104, and is shown as an elongated cylinder 120 having a front face 124. The valve head slidably engages the inlet passage 104. Closure of the inlet passage 104 of the device 100 is attained when the valve head 112 extends into the inlet passage 104 such that the exterior surface 113 of the valve head 112 abuts the interior surface 105 of the inlet passage 104. In this regard, the inner surface 105 of the inlet passage 104 serves as the "valve seat" of the mechanism 100. A preferred material of construction for the housing 102 and valve element 112 is stainless steel, and the engagement surfaces of the inlet passage 104 and valve element 112 may be coated with a thin film of a lubricant approved for food processing apparatus.

In an important aspect of the present invention, the valve head 112 is specially configured to provide a unique pressure responsive surface 122 of the valve head 112 which faces upstream and is in contact with the product flow stream of the grinding apparatus 10. This pressure surface 122 is the surface which contacts, or confronts, the product flow stream of discharge material in the discharge tube 26 of the grinding apparatus 10. Rather than having a single, planar valve surface which is oriented perpendicular to the product flow stream as in conventional style valves, the valve head 112 has a pressure surface 122 with multiple facets, or surfaces formed by the cooperation between a groove 128 and front face or part 124 to define a nonplanar pressure responsive surface in contact with the product flow stream.

The cylindrical portion 120 of the valve head 112 has groove 128 formed therein which extends downwardly at an angle θ from the upper section 117 of the valve head to the front face 124 of the valve element 110. The groove 128 is shown in FIGS. 1–4B as being circular in configuration.

The groove 128 decreases in depth relative to the exterior surface 113 of the valve head 112 in a direction rearwardly from the front face 124 until it intersects the upper section 117 of the valve head 112. The circular groove 128 shown in these Figures may be formed in the valve head 112 by means of a ball mill. Preferable and especially advantageous results have been obtained from valve elements having valve heads approximately 1.50 inch long and approximately 1.36 inch in diameter, with a groove of approximately 0.75 inch in diameter. Grooves formed in valve heads 112 having an angle θ ranging between approximately 33° and 37° have been found to give desirable results. Typically, the diameter of the groove will correspond to the largest size bone expected to be ejected from the bone collection assembly 50. The angles of the grooves may vary with the size of the valve head 112 and the stroke of the valve element 110 within the housing 102. A longer valve head 112 would have a longer stroke in and out of the inlet passage 104 and, thus the angle of the groove typically would be less. A valve head having a shorter stroke would require a greater angle.

The operation of the flow control device 100 is shown in FIGS. 2A–B and 3A–B. During operation of the grinder 10, useable food material is being ground up and passed through the smaller openings 19, 39 of the orifice plates 18, 38. Meanwhile, the bones and hard portions of the food material are passed out through the larger openings 20, 40 through the bone collection cone 24 and into the discharge tube 26 associated therewith.

Figures 2A, 2B, 3A, 3B, 4A, 4B:
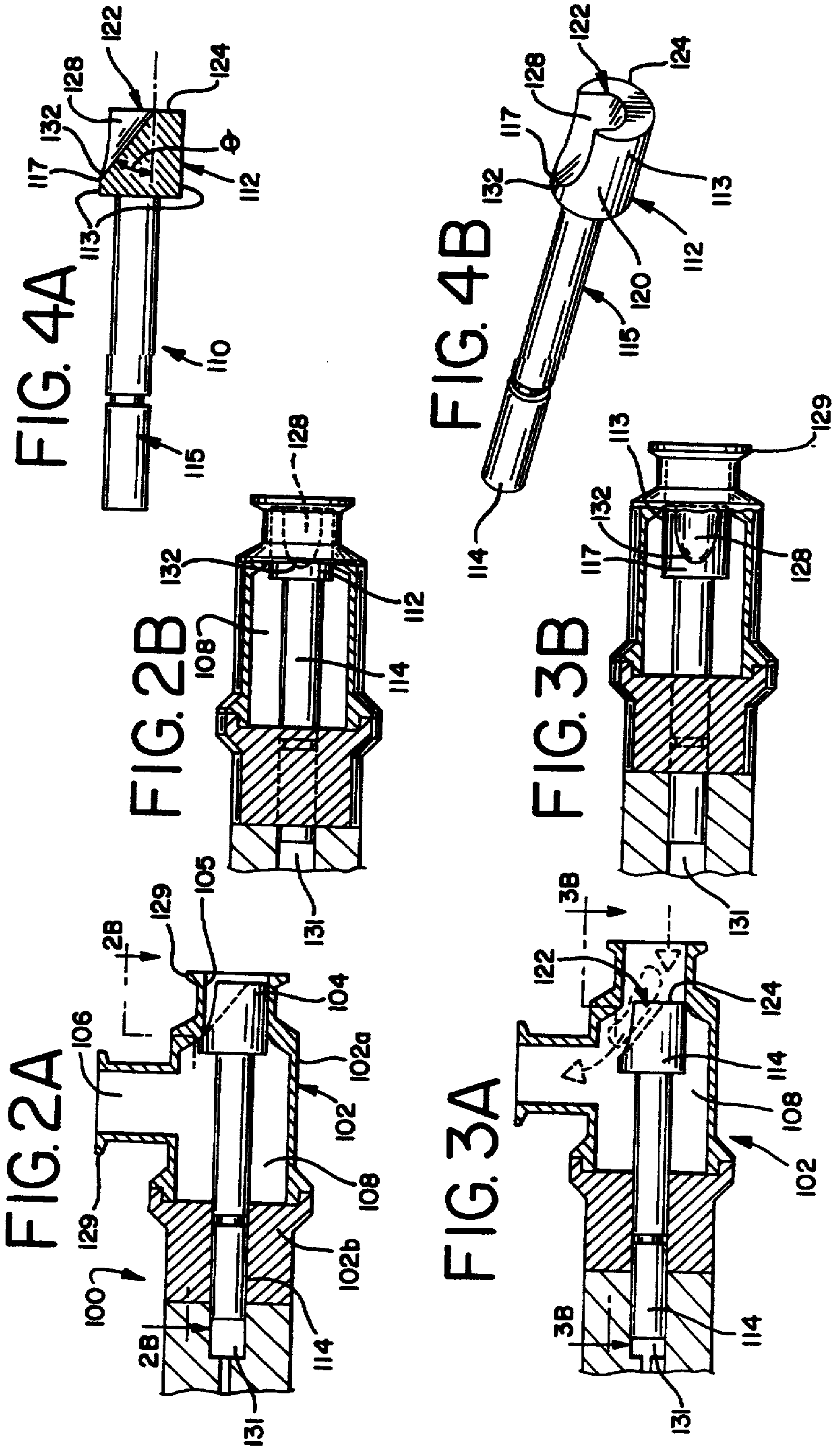
FIG. 2A is a sectional view of the bone discharge regulator used in the apparatus of FIG. 1, illustrating the regulator in a first, restricted position.
FIG. 2B is a longitudinal sectional view of the bone discharge regulator of FIG. 2A taken along line 2B—2B thereof.
FIG. 3A is a sectional view of the bone discharge regulator of FIG. 1 illustrating the regulator in a second, open position.
FIG. 3B is a longitudinal sectional view of the bone discharge regulator of FIG. 3A taken along line 3B—3B thereof.
FIG. 4A is a partial sectional view of a valve element used in the bone discharge regulator depicted in FIGS. 1-3.
FIG. 4B is a perspective view of the valve element of FIG. 4A.

As this product flow stream encounters the regulating device 100, the backpressure of the grinding apparatus 10 rises. When it reaches a preselected value which approximates the biasing force applied to the valve element 110 by the biasing means (such as spring 130 or pnuematic cylinder 131), any further increase in backpressure causes movement of the valve element 110 from its initial, restricted position illustrated in FIG. 2A to an open position as illustrated in FIG. 3A. In the restricted position, the valve head 112 lies substantially against the valve seat, i.e., the interior 105 of the inlet passage 104. The apex 132 of the groove 128 may extend slightly past the edge of the inlet passage so that smaller pieces of bones or hard material may move into the groove 128 and inch slowly out through the groove 128. (FIG. 2B.) When large chunks of bony material proceed down the discharge tube 26 into the inlet 104, the chunks will increase the system backpressure to a point where it exceeds the biasing force on valve element 110, such that the valve element 110 moves rearwardly in the housing 102 against the biasing means 130.

The groove 128 defines a restricted passage of variable size, as compared to a valve using a conventional, solid cylindrical plunger element. This groove increases the total surface area of the valve element 110 which contacts the discharge flow stream, and thus the valve element 112 of the present invention is more responsive to backpressure conditions which exist within the grinding apparatus 10 than a valve element having a solid, cylindrical head portion.

Large chunks of bones will increase the backpressure of the system and will pass out of the inlet passage 104 into the valve chamber 108 above the valve element 110, which is substantially displaced into an open position. The travel of the valve element 110 in this position is shown in FIGS. 3A and 3B. Once the chunk of discharge material has passed through the groove 128 out of the inlet passage 104, the valve element 110 returns to its restricted, closed position.

The groove 128 formed in the valve head in effect defines a low volume orifice for the valve. The groove 128, in combination with the front surface 124 of the valve head 112, allows the pressure of the product flow stream of the grinding apparatus 10 to regulate the discharge of the waste material from the grinding apparatus 10. Thus, the pressure responsive surface 122 of the valve element 110 is partially perpendicular to the product flow stream (along front face 124) and largely parallel to the product flow stream (along the groove 128). This special construction allows the pressure of the product flow stream to open and close dependent on the product stream pressure itself, without the need for any external control on the valve to regulate the orifice size. This avoids the need for manual adjustment of the apparatus. The angled face of the valve element 110 allows the valve element 112 to place a preselected backpressure on the discharge line, while intermittently "popping" out into an open position to discharge large amounts of material, while still closing very quickly. This backpressure may need to be varied depending upon the type of meat being processed. Adjustment in the backpressure of the device may be easily made by changing the air or fluid pressure or replacing the spring 130 to provide an initial biasing force on the valve element 110.

It has been found during use of the invention when grinding pork in a grinding apparatus having the construction shown in FIG. 1 and described in U.S. Pat. No. 5,251,829, the discharge from the bone collection assembly 50 has been reduced from 2% by weight down to 0.2% by weight, while still removing bone and foreign objects from the processed food.

Figure 5:
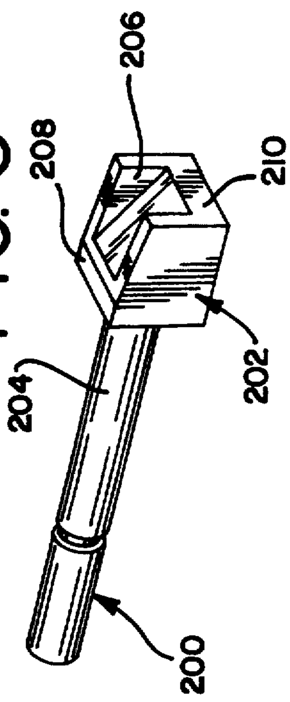
FIG. 5 is a perspective view of another embodiment of a valve element suitable for use in a bone discharge regulator constructed in accordance with the principles of the present invention.

An alternative embodiment of a valve element 200 constructed in accordance with the principles of the present invention is illustrated in FIG. 5, wherein the valve element 200 includes a non-cylindrical valve head 202 mounted on the front of a valve stem 204. The valve head 202 has a rectangular groove 206 formed therein at an angle, descending from an upper section 208 thereof to the front 210 of the valve head.

It will be understood that the embodiments of the invention which have been described are merely illustrative of the principles of the present invention. Numerous modifications may be made by those skilled in the art without departing from the true spirit and scope of the invention.

We claim:

1. In an apparatus for processing animal carcasses by removing bones and other generally unusable materials from the carcasses while grinding useable food materials from the carcasses, said apparatus having a discharge line for discharging the unusable materials to waste, the improvement comprising, a flow control assembly for controlling the flow of said materials through said discharge line during operation of said grinding apparatus, the flow control assembly including a valve housing mounted in said discharge line and in communication therewith, the valve housing including a reciprocatable valve element disposed within said housing, said valve element including a head portion which extends into an inlet passage of said valve housing, said flow control assembly including means for biasing said valve element into a first operative position wherein said valve element head portion blocks said inlet passage and contacts flow of discharge material within said discharge line, the valve element head portion having a frontal surface which is responsive to pressure of said material flow within said discharge line, whereby contact between said pressure responsive surface and said discharge material flow in said discharge line results in a movement of said valve member in a direction out of said valve housing and from said first operative position to a second operative position, said second operative position opening said inlet passage to said discharge material flow when said biasing means is overcome by pressure of said discharge material flow, said pressure responsive surface of said valve member being a multifaceted pressure responsive surface, part of said surface being perpendicular to said discharge material flow and part of said surface being non-perpendicular to said discharge material flow.

2. The apparatus of claim 1, wherein said valve element head portion is generally cylindrical and includes a groove extending longitudinally therein at a depth that decreases in downstream direction.

3. The apparatus of claim 2, wherein said valve member has a longitudinal axis, and said groove extends within said valve element head portion at an acute angle from said longitudinal axis.

4. The apparatus of claim 3, wherein said groove has a curved surface and is disposed in said valve element head portion at an angle of between approximately 33° and approximately 37° from said valve member longitudinal axis.

5. The apparatus of claim 2, wherein said groove has a cylindrical surface which extends rearwardly in said valve member head portion from said frontal surface and angularly upwardly such that said groove has a depth which varies along its length.

6. The apparatus of claim 2, wherein said groove defines an opening through said inlet passage when said valve member is in said second operative position, which opening accommodates passage of large pieces of discharge material through said assembly.

7. The apparatus of claim 1, wherein said flow means for biasing said valve element into said first operative position includes a pneumatic cylinder which applies air pressure to said valve element.

8. The apparatus of claim 1, further including an outlet passage disposed in said valve housing at an angle to said inlet passage.

9. The apparatus of claim 1, wherein said valve element is generally rectangular and includes a groove extending longitudinally therein extending between said frontal surface and an upper surface of said valve element.

10. The apparatus of claim 1, wherein said inlet passage of said valve housing is completely open to said material discharge flow when said valve member is in said second operative position.

11. An assembly for regulating the discharge of bones and hard material discharged from a food processing grinding apparatus, the discharge regulating assembly comprising a valve member reciprocatably mounted in a valve housing inserted into a discharge line of said grinding apparatus, the valve housing having an inlet passage and an outlet passage, the valve member being disposed in said valve housing generally between the inlet and outlet passages, said discharge regulating assembly further including means for applying a preselected force to said valve member for biasing it into a closed position wherein a head portion of said valve member is substantially contained within said inlet passage to thereby prevent flow of discharge material out of said grinding apparatus through said valve housing, the valve head having an actuating surface opposing said material being discharged from said grinding apparatus through said discharge line, the actuating surface having multiple components which are responsive to pressure of discharge material in said discharge line, one of said actuating surface components being an elongated groove of variable depth, said actuating surface multiple components cooperating to define a pressure responsive surface of said valve head, whereby, when the pressure of said discharge material in said discharge line exceeds said biasing force, said valve member moves out of said closed position and said groove defines an opening of variable depth in said inlet passage which permits the discharge material out of said discharge line through said housing, said groove depth being dependent upon movement of said valve member out of said closed position.

12. The discharge regulating assembly of claim 11, wherein said head portion is cylindrical.

13. The discharge regulating assembly of claim 12, wherein said groove has a curved surface, said groove having a depth which varies along the length of the groove and said head portion, the depth being greatest at a front face of said valve head portion and least at an upper section of said valve head portion.

14. The discharge regulating assembly of claim 12, wherein said valve head groove has a planar surface.

15. The discharge regulating assembly of claim 11, wherein said groove has a planar surface.

16. The discharge regulating assembly of claim 11, wherein said means for biasing said valve member includes a compression spring.

17. The discharge regulating assembly of claim 11, wherein said means for biasing said valve member includes a pneumatic cylinder.

18. The discharge regulating assembly of claim 11, wherein said pressure responsive surface is a ramped surface.

19. The discharge regulating assembly of claim 11, wherein another component of said pressure responsive surface components includes a surface of said valve head oriented generally perpendicularly to said inlet passage.

20. An apparatus for controlling the flow within a discharge line of unusable material consisting of bones and other hard material discharged from a food grinding apparatus, the flow control apparatus comprising a valve body defining a valve chamber, a valve element mounted within the valve chamber for controlling flow of discharge material between inlet and outlet ports of said valve chamber, the valve element having a head portion adapted for passage in and out of said inlet port, means for applying a biasing force to said valve element to maintain said valve element in a first operative position wherein said valve head position is contained in said inlet port such that flow discharge material through said discharge line into said valve chamber is substantially prevented, valve actuating means responsive to pressure of said discharge material including a pressure responsive surface disposed on said valve element which contacts said discharge material, said pressure responsive surface being oriented both perpendicular and non-perpendicular to flow of discharge material and including a groove longitudinally extending within said valve element head portion and defining a discharge passage through said valve element head portion.

21. The flow control apparatus of claim 20, wherein said valve element head portion groove is an arcuate groove and extends with said head portion at an angle to the longitudinal axis thereof, whereby said groove has a variable depth along its length, said groove depth being greatest at said valve element pressure responsive surface.

22. The flow control apparatus of claim 20, wherein said valve element includes a plunger element, the plunger having a rectangular head portion.

23. The flow control valve of claim 20, wherein said biasing means includes spring means.

24. The flow control apparatus of claim 20, wherein said inlet port is cylindrical, said valve element head portion is cylindrical and said valve element pressure surface groove is arcuate.

25. An apparatus for controlling the flow within a discharge line of an item of food processing equipment, wherein the discharge line conveys a flow of discharge material containing bones and other hard materials, the flow control apparatus comprising a pressure actuatable valve inserted into said discharge line, the valve having a valve body with an inlet passage, an outlet passage and a valve chamber, the inlet passage facing in an upstream direction of said material discharge line, a valve element assembly mounted in the valve chamber, the valve element having a valve head portion mounted on an elongated valve stem portion, the valve element being reciprocatable in said valve body between a first position and a second position, the first position being where said valve head portion extends into said inlet passage and substantially blocks flow of said discharge material through said discharge line into said inlet passage, said valve element being biased into said first position by a biasing means, said valve head portion having a pressure responsive surface opposing said material discharge flow in said material discharge line, said pressure responsive surface having a first portion which is perpendicular to said discharge material flow and a second portion which is non-perpendicular to said discharge material flow, said valve element second position being where said pressure responsive surface non-perpendicular portion is withdrawn from said inlet passage to the extent that an opening is defined in said inlet passage which permits flow of discharge material through said inlet passage.

26. The flow control apparatus of claim 25, wherein said pressure responsive surface non-perpendicular portion includes a groove in said valve element head portion.

27. The flow control apparatus of claim 26, wherein said groove is a curved groove.

28. The flow control apparatus of claim 26, wherein said groove has a depth which varies along the length of said groove and said valve element head portion, the groove depth being greatest at a front face of said head portion and least at an upper surface of said head portion.

29. The flow control apparatus of claim 25, wherein said valve element biasing means includes a pneumatic cylinder.

30. The flow control apparatus of claim 25, wherein said valve element biasing means includes a compression spring.

31. The flow control apparatus of claim 25, wherein said pressure responsive surface non-perpendicular portion includes a ramp extending longitudinally through said valve element head portion.

* * * * *